(12) United States Patent
Danilak

(10) Patent No.: US 8,392,727 B2
(45) Date of Patent: Mar. 5, 2013

(54) SYSTEM AND METHOD FOR TRANSPARENT DISK ENCRYPTION

(75) Inventor: Radoslav Danilak, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 337 days.

(21) Appl. No.: 12/005,857

(22) Filed: Dec. 27, 2007

(65) Prior Publication Data

US 2008/0130901 A1 Jun. 5, 2008

Related U.S. Application Data

(62) Division of application No. 11/358,330, filed on Feb. 21, 2006, now Pat. No. 7,849,510, which is a division of application No. 10/214,988, filed on Aug. 7, 2002.

(51) Int. Cl.
G06F 21/00 (2006.01)
(52) U.S. Cl. .......... 713/193; 726/26
(58) Field of Classification Search .......... None
See application file for complete search history.

(56) References Cited

U.S. PATENT DOCUMENTS

| | | | |
|---|---|---|---|
| 4,278,837 A | 7/1981 | Best | |
| 5,172,379 A | 12/1992 | Burrer et al. | |
| 5,212,729 A | 5/1993 | Schafer | |
| 5,233,616 A | 8/1993 | Callander | |
| 5,235,641 A | 8/1993 | Nozawa et al. | |
| 5,313,464 A | 5/1994 | Reiff | |
| 5,325,430 A * | 6/1994 | Smyth et al. | 713/192 |
| 5,349,643 A | 9/1994 | Cox et al. | |
| 5,452,429 A | 9/1995 | Fuoco et al. | |
| 5,553,264 A | 9/1996 | Ozveren et al. | |
| 5,610,981 A | 3/1997 | Mooney et al. | |
| 5,666,371 A | 9/1997 | Purdham | |
| 5,677,952 A | 10/1997 | Blakley et al. | |
| 5,696,927 A | 12/1997 | MacDonald et al. | |
| 5,870,468 A * | 2/1999 | Harrison | 713/165 |
| 5,937,063 A | 8/1999 | Davis | |
| 5,987,627 A | 11/1999 | Rawlings, III | |
| 6,049,476 A | 4/2000 | Laudon et al. | |
| 6,076,182 A | 6/2000 | Jeddeloh | |
| 6,115,787 A | 9/2000 | Obara | |
| 6,185,681 B1 | 2/2001 | Zizzi | |
| 6,216,245 B1 | 4/2001 | Noda | |
| 6,249,866 B1 * | 6/2001 | Brundrett et al. | 713/165 |
| 6,279,072 B1 | 8/2001 | Williams et al. | |
| 6,360,300 B1 | 3/2002 | Corcoran et al. | |

(Continued)

FOREIGN PATENT DOCUMENTS

EP 1122645 8/2001

OTHER PUBLICATIONS

Bryant, Randal. O'Hallaron David, Computer Systems, A Programmer's Perspective, 2001, pp. 1-763.*

(Continued)

*Primary Examiner* — Eleni Shiferaw
*Assistant Examiner* — Jeffery Williams

(57) ABSTRACT

A data storage system providing transparent encryption. The data storage system has a hardware encryption/decryption engine and a register coupled to the hardware encryption/decryption engine. The register is for securely storing a key for encrypting and decrypting data. The key may not be read from outside the data storage system. More specifically, the key may not be read by the operating system. The user does not have access to the encryption key, but may have a password that is passed to a controller coupled to the encryption/decryption engine. The controller verifies the password and causes data received from main memory to be encrypted by the hardware encryption/decryption engine using the key. The controller also transfers the encrypted data to the data storage device.

11 Claims, 6 Drawing Sheets

U.S. PATENT DOCUMENTS

| | | | |
|---|---|---|---|
| 6,365,966 | B1 | 4/2002 | Chen et al. |
| 6,442,659 | B1 | 8/2002 | Blumenau |
| 6,449,689 | B1 | 9/2002 | Corcoran et al. |
| 6,457,155 | B1 | 9/2002 | Dell et al. |
| 6,473,861 | B1 | 10/2002 | Stokes |
| 6,477,624 | B1* | 11/2002 | Kedem et al. ............... 711/147 |
| 6,516,397 | B2 | 2/2003 | Roy et al. |
| 6,662,333 | B1 | 12/2003 | Zhang et al. |
| 6,691,209 | B1 | 2/2004 | O'Connell |
| 6,704,871 | B1 | 3/2004 | Kaplan et al. |
| 6,718,444 | B1 | 4/2004 | Hughes |
| 6,742,116 | B1 | 5/2004 | Matsui et al. |
| 6,763,458 | B1 | 7/2004 | Watanabe et al. |
| 6,804,162 | B1 | 10/2004 | Eldridge et al. |
| 6,857,076 | B1* | 2/2005 | Klein ............... 713/189 |
| 6,898,707 | B1 | 5/2005 | Sit et al. |
| 6,968,424 | B1 | 11/2005 | Danilak |
| 6,981,141 | B1* | 12/2005 | Mahne et al. ............... 713/165 |
| 7,051,152 | B1 | 5/2006 | Danilak |
| 7,058,769 | B1 | 6/2006 | Danilak |
| 7,082,530 | B1* | 7/2006 | Diamant ............... 713/153 |
| 7,096,370 | B1 | 8/2006 | Klein |
| 7,117,421 | B1 | 10/2006 | Danilak |
| 7,152,156 | B1 | 12/2006 | Babbitt et al. |
| 7,215,774 | B2 | 5/2007 | Onagawa |
| 7,231,050 | B1 | 6/2007 | Harris |
| 7,242,768 | B2* | 7/2007 | Challener ............... 380/44 |
| 7,278,016 | B1 | 10/2007 | Detrick et al. |
| 7,606,364 | B1 | 10/2009 | Shih |
| 2001/0050989 | A1 | 12/2001 | Zakiya |
| 2002/0029315 | A1 | 3/2002 | Williams et al. |
| 2002/0073298 | A1 | 6/2002 | Geiger et al. |
| 2002/0099950 | A1 | 7/2002 | Smith |
| 2002/0138747 | A1 | 9/2002 | Clarke |
| 2003/0037248 | A1 | 2/2003 | Launchbury et al. |
| 2003/0046529 | A1 | 3/2003 | Loison et al. |
| 2003/0058873 | A1 | 3/2003 | Geiger et al. |
| 2003/0065925 | A1 | 4/2003 | Shindo et al. |
| 2003/0084308 | A1 | 5/2003 | Van Rijnswou |
| 2003/0108196 | A1 | 6/2003 | Kirichenko |
| 2003/0115472 | A1 | 6/2003 | Chang |
| 2003/0177401 | A1* | 9/2003 | Arnold et al. ............... 713/202 |
| 2003/0188179 | A1* | 10/2003 | Challener et al. ............... 713/193 |
| 2003/0212868 | A1 | 11/2003 | Alfieri et al. |
| 2007/0140486 | A1 | 6/2007 | Haran |
| 2007/0143611 | A1* | 6/2007 | Arroyo et al. ............... 713/171 |
| 2008/0232581 | A1 | 9/2008 | Elbaz et al. |
| 2009/0319782 | A1* | 12/2009 | Lee ............... 713/156 |
| 2010/0005289 | A1 | 1/2010 | Devanand et al. |

OTHER PUBLICATIONS

Helger Lipmaa, Phillip Rogaway, and David Wagner, Comments to NIST Concerning AES-modes of Operations; CTR_mode Encryption. In Symmetric Key Block Cipher Modes of Operation Workshop, Baltimore, Maryland, US, Oct. 20, 2000.*

Chodowiec, Pawel, "Comparison of the Hardware Performance of the AES Candidates Using Reconfigurable Hardware", Gearge Maason University, 2002, pp. 1-141.*

Gobioff, Howard, "Security for a High Performance Commodity Storage Subsystem", 1999, Carnegie Mellon University, pp. 1-222(Per 37 C.F.R. 1.98d), a copy of this reference is not required and is not submitted because this reference was previously cited by or submitted to the PTO in prior parent application 10214988 to which the present application 12005857 claims priority under 35 U.S.C. 120 for an earlier effective filed.).

Haran et al., "CTR Mode for Encryption", 2002, grouper.ieee.org/groups/802/3/efm/public/jul02/p2mp/haran.sub-p2mp.sub-2sub-0702.pdf (Per 37 C.F.R. 1.98d), a copy of this reference is not required and is not submitted because this reference was previously cited by or submitted to the PTO in prior parent application 10214988 to which the present application 120055857 claims priority under 35 U.S.C. 120 for an earlier effective filing date.)

Schneier, Bruce, Applied Cryptography, 1996, Wiley & Sons, p.173. (Per 37 C.F.R. 1.98d), a copy of this reference is not required and is not submitted because this reference was previously cited by or submitted to the PTO in prior parent application 10214988 to which the present application 120055857 claims priority under 35 U.S.C. 120 for an earlier effective filing date.)

Wagner, et al. "Comments to NIST Concerning AES-modes of Operations: CTR-mode Encryption". In Symmetric Key Block Cipher Modes of Operation Workshop, Baltimore, Maryland, US, Oct. 20, 2000. pp. 1-4 (Per 37 C.F.R. 1.98d), a copy of this reference is not required and is not submitted because this reference was previously cited by or submitted to the PTO in prior parent application 10214988 to which the present application 12005857 claims priority under 35 U.S.C. 120 for an earlier effective filing date.).

* cited by examiner

500

```
BEGIN
  ↓
MAP A DATA STORAGE DEVICE INTO A PLURALITY OF
PARTITIONS (STORE MAPPING IN A TABLE IN MEMORY
CONTROLLER)
510
  ↓
GENERATE A PLURALITY OF UNIQUE KEYS
520
  ↓
STORE THE PLURALITY OF UNIQUE KEYS IN A MEMORY
CONTROLLER COUPLED TO THE STORAGE DEVICE
530
  ↓
ENCRYPT DATA USING THE APPROPRIATE KEY
540
  ↓
STORE THE ENCRYPTED DATA IN THE APPROPRIATE PARTITION
550
  ↓
END
```

FIGURE 5

SYSTEM AND METHOD FOR TRANSPARENT DISK ENCRYPTION

CROSS-REFERENCE TO RELATED APPLICATIONS

This application is a divisional of U.S. patent application Ser. No. 11/358,330 filed Feb. 21, 2006, which is a divisional of U.S. patent application Ser. No. 10/214,988 filed Aug. 7, 2002.

BACKGROUND ART

The proliferation of laptop computers has made it more important than ever to protect the data on a hard drive from theft. For example, if a laptop is stolen, the contents of the hard drive are extremely vulnerable, even if steps are taken to protect the data. Considering that many corporate and government employees routinely take their laptops home, the contents may contain extremely valuable and sensitive information, which an unauthorized user or a thief may be willing to go to significant lengths to extract.

One technique for protecting the data on a hard drive is a password-locked hard drive. In this case, a software routine allows access to the data only if the proper user code and password are entered. While this may provide some measure of protection, a moderately computer savvy thief can easily recover the contents of the hard drive that are stored without encryption. For example, the thief may read the contents of the hard drive by either physically removing the hard drive and attaching it to another host computer or by using specialized disk recovery equipment. In this fashion, the contents may be dumped sector by sector and read without the password.

Another technique to protect data on a hard drive is an operating system encrypting selected files to be stored to the hard drive. In this case, files are encrypted on a file-by-file basis. For example, the operating system may have an option that prompts the user to encrypt files. However, the user may decide to leave the encryption option off because it may be too time consuming or inconvenient. Moreover, when the user does turn on the encryption option, the user may choose not to encrypt some files that should be. Hence, much of the data is vulnerable and this option relies too heavily on user interaction.

Furthermore, it may be impossible to use the operating system encryption option for some types of files and/or applications. Examples of files for which this encryption may be unavailable are compressed files, memory mapped files, swap files, and garbage files. For example, the hard drive may receive a temporary file that is not encryptable by this method. Therefore, the operating system encryption option is unusable with certain types of files and data connected to certain applications.

Additionally, the operating system encryption option may consume substantial central processor unit (CPU) time (e.g., 25% of CPU utilization) during encryption and decryption. Thus, this method severely impacts system performance.

Therefore, it would be advantageous to provide a way to protect data on a hard drive. It would also be advantageous to protect data on a hard drive via a method that is not vulnerable to theft by simply bypassing a password. It would also be advantageous to protect data on a hard drive via a method that does not require the user to painstakingly encrypt files on a file-by-file basis. It would also be advantageous to protect all types of files stored on a hard drive and data connected with any application. Furthermore, it would be advantageous to protect data on a hard drive without impacting system performance or relying too heavily on user interaction.

SUMMARY OF THE INVENTION

The present invention protects data on a hard drive by performing encryption at a hardware level transparently to system software (e.g., operating system software). Embodiments of the present invention protect data on a hard drive via a method that is not vulnerable to theft by simply bypassing a password. Embodiments of the present invention also protect data on a hard drive without requiring the user to painstakingly encrypt files on a file-by-file basis. Embodiments of the present invention protect all types of files stored on a hard drive and files connected with any application. Embodiments of the present invention protect data on a hard drive without impacting system performance or relying on human interaction. The present invention provides these advantages and others not specifically mentioned above but described in the sections to follow.

A data storage system providing transparent encryption is disclosed. In one embodiment, the data storage system has a hardware encryption/decryption engine and a register coupled to the hardware encryption/decryption engine. The register is for securely storing a key for encrypting and decrypting data. The key may not be read from outside the data storage system. More specifically, the key may not be read by the operating system. The user does not have access to the encryption key, but may have a password that is passed to a controller coupled to the encryption/decryption engine. The controller verifies the password and causes data received from main memory to be encrypted by the hardware encryption/decryption engine using the key. The controller also transfers the encrypted data to the data storage device.

Another embodiment of the present invention provides for a method of performing encryption and decryption. The method starts with a controller receiving a request, along with a password, from a program to store data on a storage medium. The controller verifies the password and causes a hardware encryption/decryption engine to encrypt the data using a key stored in hardware. Then, the memory controller transfers the data to the storage medium. At some later time, the controller reads the encrypted data from the storage medium, in response to a request for the data. Then, the hardware encryption/decryption engine decrypts the data using the key. Finally, the controller transfers the data to main memory. Thus, the encryption/decryption is transparent to the requesting program.

In another embodiment, file-by-file encryption performed by an operating system is combined with the method of performing encryption and decryption of the previous embodiment.

In another embodiment, a data storage device is mapped into multiple partitions, with the mapping stored in a controller coupled to the data storage device. A unique key is generated for each partition and the keys are securely stored in the controller. In response to a request from a software program, data is encrypted in a hardware encryption/decryption engine coupled to the controller using one of the keys and the encrypted data is stored in the corresponding partition of the data storage device.

BRIEF DESCRIPTION OF THE DRAWINGS

The accompanying drawings, which are incorporated in and form a part of this specification, illustrate embodiments

FIG. 5 is a flowchart illustrating steps of a process storing encrypted data on a hard drive in multiple partitions, according to an embodiment of the present invention.

DETAILED DESCRIPTION OF THE INVENTION

Figure 1:
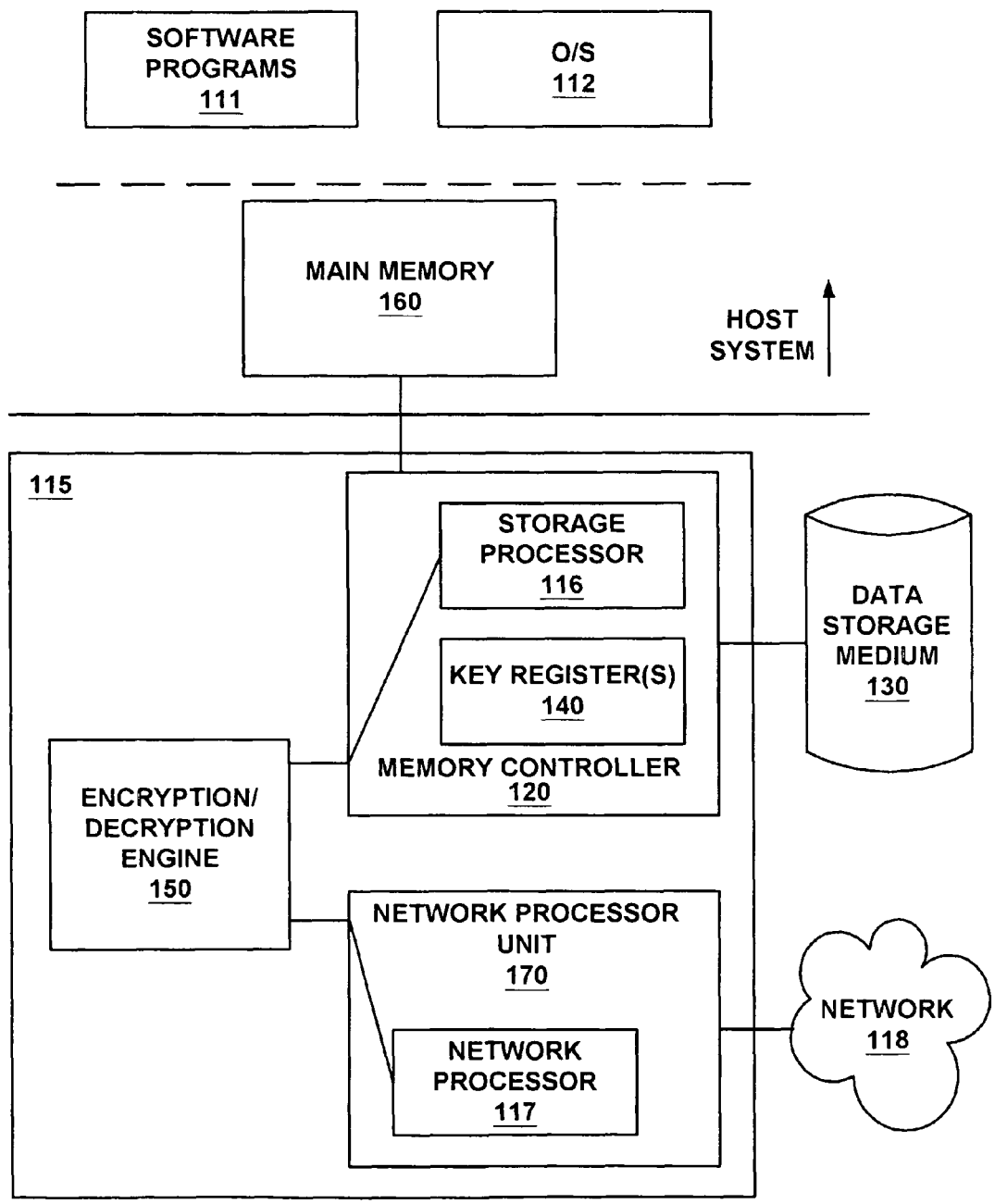
FIG. 1 is a block diagram of a system for encrypting/decrypting data on a storage medium, according to an embodiment of the present invention.

In the following detailed description of the present invention, a method and system for transparent encryption/decryption, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Embodiments of the present invention perform encryption at a hardware level and are thus transparent to all software layers (e.g., transparent to the operating system). Referring now to the embodiment of FIG. 1, a card, embedded system, or peripheral component 115 has a hardware encryption/decryption engine 150 for encrypting and decrypting data. The card 115 may be, for example, a graphics card, although embodiments of the present invention are not so limited. The card 115 may also be referred to as a data storage system. The card 115 has a memory controller for accessing a data storage medium 130 (e.g., hard drive). The memory controller 120 also has one or more key registers 140 for storing a key(s) for encrypting and decrypting data. Public key encryption may be used.

The card 115 receives requests from, for example, a software program 111 or an operating system 112 to store data (e.g., from main memory 160) to the data storage medium 130. Along with the request, the card 115 may receive a password, which may be used to unlock a key in a key register 140. The data is encrypted in the hardware encryption/decryption engine 150 with the key before it is transferred to the data storage medium 130. The memory controller 120 may receive the data and send it to the hardware encryption/decryption engine 150 or cause the data to be transferred directly from main memory 160 to the hardware encryption/decryption engine 150. Upon chip reset the encryption mode may be off, wherein encryption is enabled by, for example, a command from the operating system 112. However, this is not required. Upon a request from the software program 111 or operating system 112 containing a valid password, the memory controller 120 accesses the data from the data storage medium 130 and has it decrypted by the hardware encryption/decryption engine 150 using the key and passed back to main memory 160. In this fashion, the encryption/decryption is transparent to the requesting program.

Referring still to FIG. 1, the memory controller 120 may share the encryption/decryption engine 150 with another component. For example, a network processor 117 in a network processing unit 170 for interfacing with a network 118 may be coupled to the encryption/decryption engine 150. The memory controller 120 may have a storage processor 116 coupled to the encryption/decryption engine 150. In this fashion, the network processor 117 and the storage processor 116 share the hardware encryption/decryption engine 150.

Still referring to FIG. 1, the encryption/decryption engine 150 may be implemented in hardware in order to process data at a sufficient speed. For example, 1 GB/s network traffic maybe 125 MB/s in full duplex and 125 MB/s for encryption and 125 MB/s for decryption. There may be, for example, two memory controllers 120, each supporting, for example, 133 MB/s. The encryption/decryption engine 150 may be configurable such that it may be used for both encryption and decryption simultaneously. Thus, this embodiment provides a low cost and low gate count solution.

Figure 2:
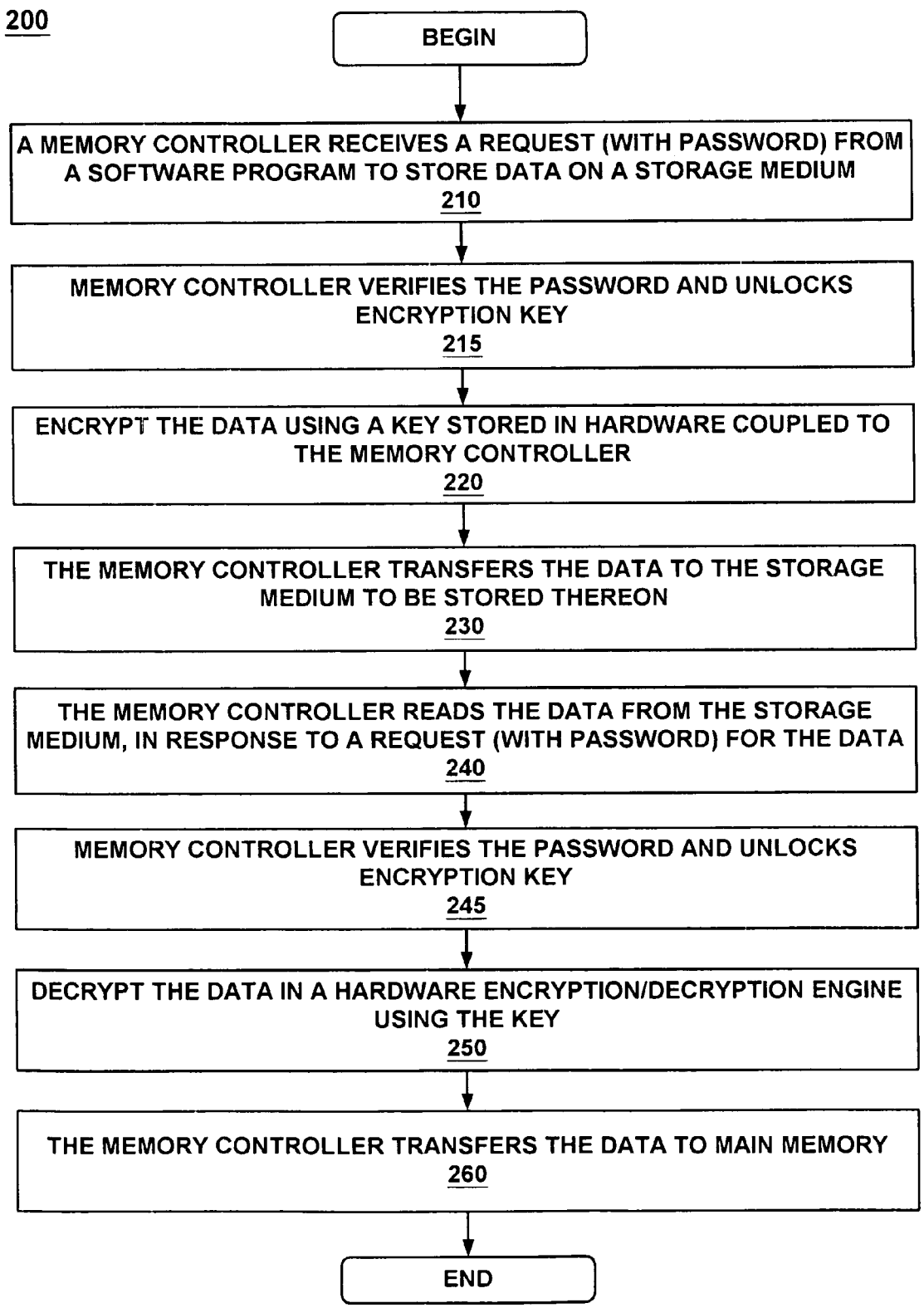
FIG. 2 is a flowchart illustrating steps of a process of performing encryption at a hardware level, according to an embodiment of the present invention.

FIG. 2, is a flowchart illustrating a process 200 in which data is encrypted and decrypted in a fashion that is transparent to a program (111, 112) requesting that data be stored on a data storage medium 130. In step 210, a memory controller 120 receives a request from the program (111, 112) to store data on a data storage medium 130. The request may be for any data that is to be stored on the data storage medium 130. The requesting program (111, 112) need not be aware that the data is to be encrypted when stored on the data storage medium 130, although optionally it may be so informed. The data may already be encrypted when received or not, may be compressed or uncompressed, and may be associated with any requesting program (111, 112). Thus, embodiments of the present invention may be used along with encryption performed in software, for example, by the operating system 112. A password to unlock the encryption key may also be passed to the memory controller 120.

In step 215, the memory controller 120 verifies the password and unlocks the encryption key stored in the key register 140. For example, the memory controller 120 forwards the key to the hardware encryption/decryption engine 150. If the password is invalid, the memory controller 120 may refuse to forward the key and/or refuse to transfer data to the data storage medium 130. In one embodiment, the data is always encrypted even if no password is received.

In step 220, the data is encrypted at a hardware level using the key stored in hardware and to which the memory controller 120 has access. For example, the memory controller 130 may route the data to the hardware encryption/decryption engine 150. To produce the key, a random number may be generated by the hardware (e.g., in the memory controller 120). In one embodiment, the unencrypted key cannot be read from outside the hardware (e.g., cannot be read outside to card 115) and never leaves the hardware.

In step 230, the memory controller 120 transfers the encrypted data to the data storage medium 130 to be stored thereon. In contrast to prior art, the entire data storage medium 130 may be encrypted, not just files. For example, rather than encrypting on a file-by-file basis, the memory controller 120 may encrypt all data that is to be stored. However, it is not required that all data be encrypted. Also, embodiments of the present invention provide for using different keys to encrypt different data.

At some later point in time, the memory controller 120 reads the encrypted data from the data storage medium 130, in response to a request for the data, in step 240. The memory controller 120 also receives a password to unlock the encryption key. For example, the key is transferred to the hardware encryption/decryption engine 150. The password may be the same password received in step 210. However, in one embodiment different users may have their own passwords, and hence this may be a different password than received in step 210. The operating system 112 and device drivers issue commands to the memory controller 120 as if no encryption were being done. Thus, process 200 is transparent to software layers (e.g., software programs 111, operating system 112).

In step 245, the memory controller 120 verifies the password and unlocks the encryption key stored in the key register 140. For example, the memory controller 120 forwards the key to the hardware encryption/decryption engine 150. If the password is invalid, the memory controller 120 may refuse to forward the key.

The data is then decrypted, in step 250. The memory controller 120 may route the data to the hardware encryption/decryption engine 150 either directly from the data storage device 130 or after passing though the memory controller 120. Of course, the hardware encryption/decryption engine 150 may reside within the memory controller 120, in one embodiment.

In step 260, the memory controller 120 transfers the data to main memory 160, such that it is available to the requesting program (111, 112). In this fashion, the encryption is performed at a hardware level and is transparent to all layers of software. Process 200 then ends.

Embodiments of the present invention allow for one or more user supplied passwords to be involved with the encryption process. In this fashion, a single user or a group of users may have access to all or a selected portion of data (e.g., file or partition) on the data storage medium 130. For example, many of today's BIOS (Basic Input/Output System) implementations support password protection. In one implementation, this password (or another password) may be used as a base for the encryption/decryption key. However, if the user loses his or her password, the encrypted content of the data storage medium 130 may be lost. Furthermore, if the user changes the password, the encrypted data needs to be re-encrypted with the new password.

Therefore, instead of using the password directly to encrypt the data, the encryption key may be randomly generated, with the password being used to encrypt and decrypt the encryption key, in one embodiment. In order to store data, the user supplies the password, which is used to decrypt the key, which in turn is used to encrypt the data. Because the data is always encrypted with just the encryption key (e.g., the encryption does not directly use the password), if the user wishes to change the password the data does not need to be re-encrypted. Only the key needs to be re-encrypted using the new password. However, because the encryption key is randomly generated, if the user loses the password, the data cannot be recovered. Also, this embodiment protects against the event that the user may leave the company and refuse to provide the password.

Thus, rather than encrypting the data with a key that is unique for each user, the data may be encrypted with an encryption key that is known by an administrator, in one embodiment. This known key is encrypted/decrypted with the user password. If the user leaves the company or forgets the password, the data may be recovered using the known password.

Figure 3:
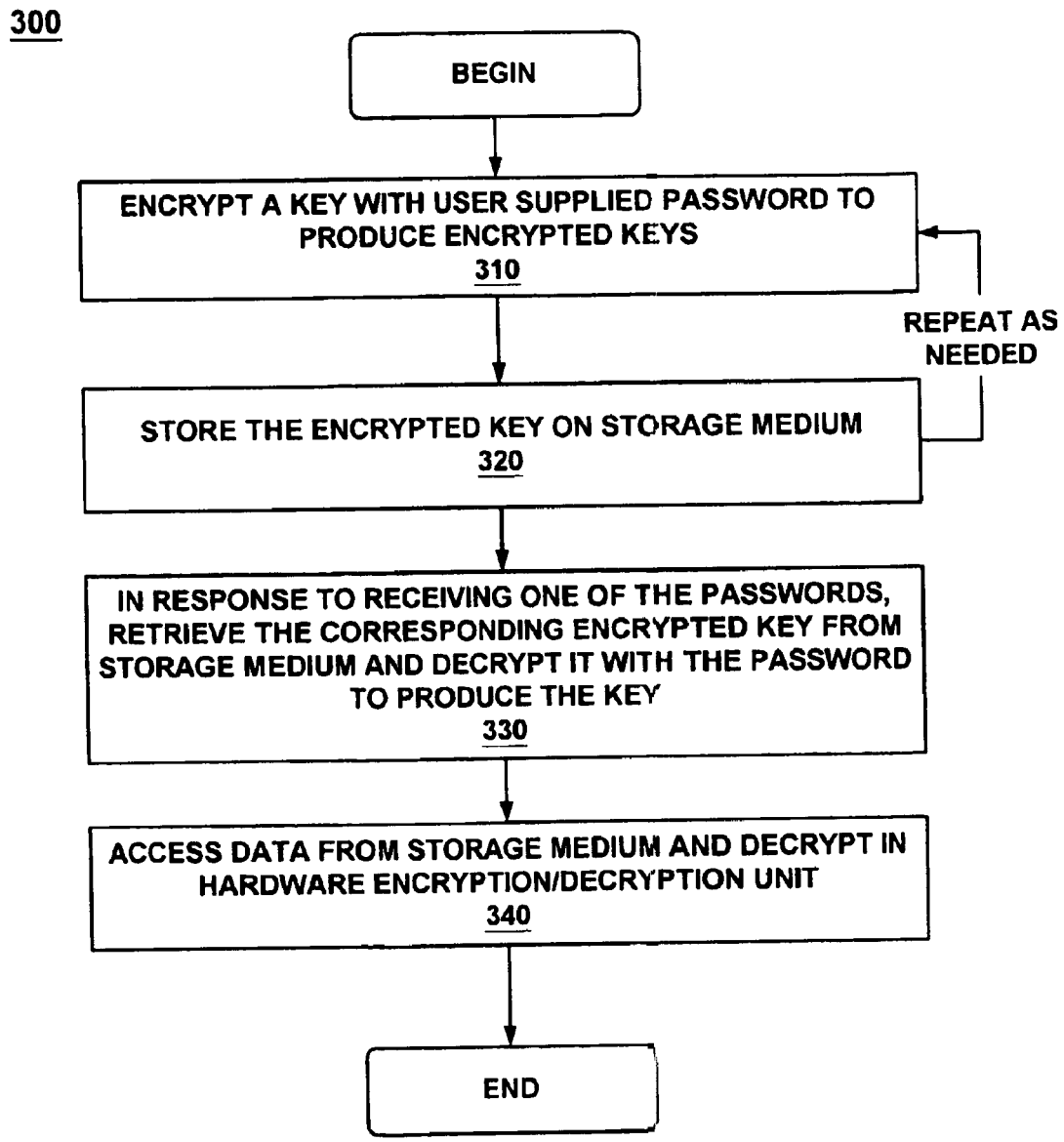
FIG. 3 is a flowchart illustrating steps of a process of encrypting data on a hard drive with multiple users sharing a common key, according to an embodiment of the present invention.

There are times when a user may desire to share with several others the information encrypted on the data storage medium 130. While all the users could share a password, this is undesirable because users may tend to use the same or similar passwords for a variety of endeavors. FIG. 3 illustrates a process 300 in which multiple users share a common key but use their own personal passwords to encrypt the key. Each user supplies a unique personal password. This may be implemented as a BIOS option, but is not so limited. In step 310, the encryption key is encrypted with one of the user personal passwords. The encryption key may be randomly generated within the hardware in which the memory controller 120 resides.

In step 320, the encrypted personal password is stored on the data storage medium 130. For example, the encrypted key may be stored on the first sector of the data storage medium 130. However, the personal password is not stored on the data storage medium 130. Furthermore, the key is neither stored nor transferred outside the hardware "in the clear." Steps 310 and 320 are repeated for each user personal password and may be performed at any time. Furthermore, the personal passwords may be changed at any time without re-encrypting data on the data storage medium 130. Only the encrypted key on the data storage medium 130 has to be re-encrypted.

In step 330, the memory controller 120 retrieves one of the personal password encrypted keys from the data storage medium 130 and causes the key to be decrypted by the hardware encryption/decryption engine 150 using a personal password supplied from a user.

In step 340, the memory controller 120 accesses encrypted data from the data storage medium 130 and causes it to be decrypted by the hardware encryption/decryption engine 150 using the just decrypted key. The memory controller 120 then causes the decrypted data to be sent to main memory 160. Process 300 then ends.

In the rare event that two users have the same password (which may be used to encrypt the key), the encrypted key would be the same unless extra precautions are taken. This is undesirable, as it makes it possible for someone to decipher another's password by noting that the key encrypted to the same value. An embodiment of the present invention all but ensures that this will not happen by adding a random number to the key before encrypting it. Thus, even if the same two passwords are used, a different encrypted key will result. When decrypting the password-encrypted key, the random numbers are thrown away. Thus, the same encryption key is used by everyone in the group.

Figure 4:
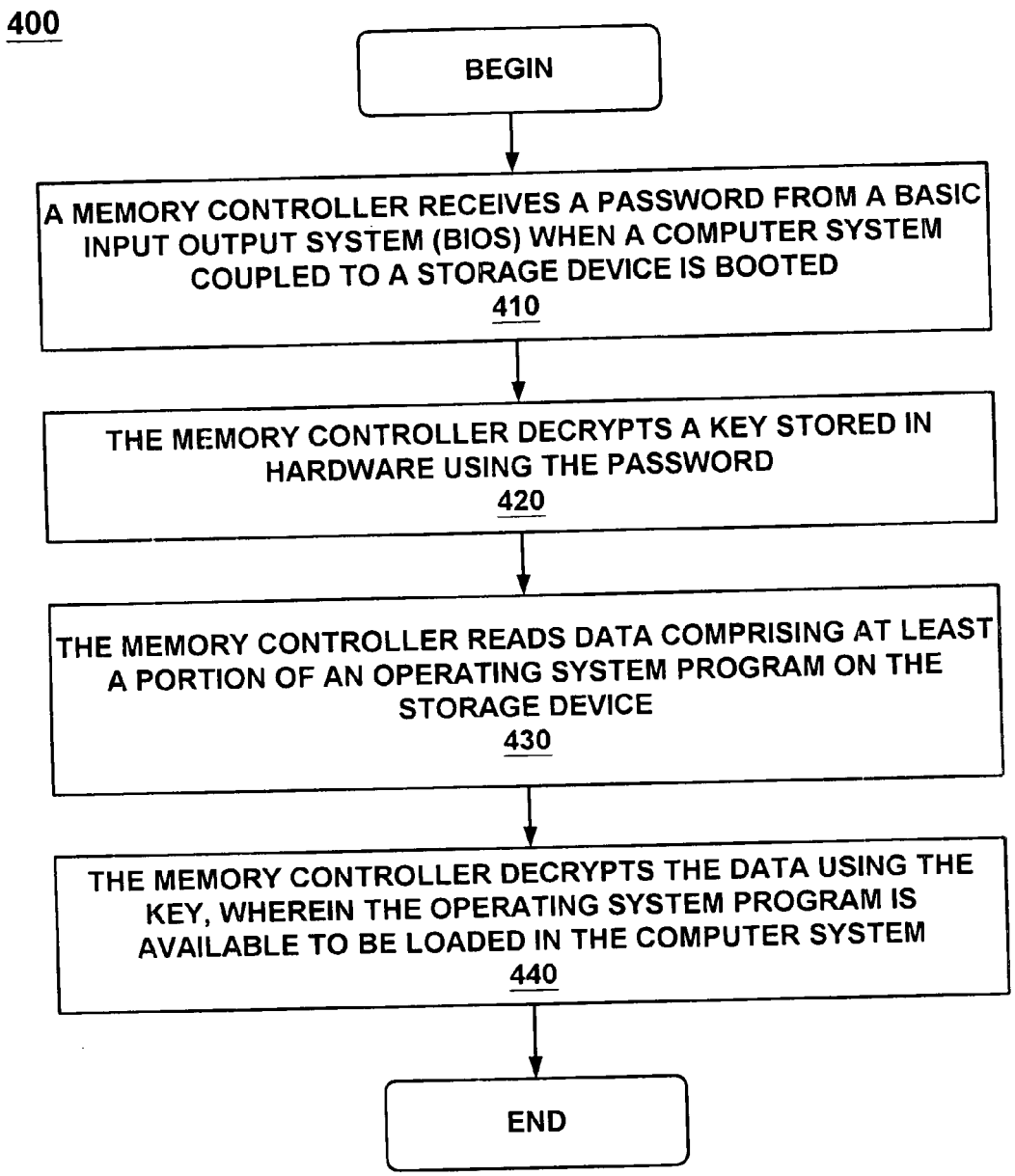
FIG. 4 is a flowchart illustrating steps of a process of booting a computer system whose hard drive is encrypted, according to an embodiment of the present invention.

In the event that all the data the entire data storage medium 130 is encrypted, then there needs to be a way to decrypt the data at boot-up time. Referring now to step 410 of process 400 in FIG. 4, in one embodiment, the memory controller 120 receives a password from, for example, the BIOS while the computer is begin booted. In some cases, a user may enter the password at boot-up time. In other cases, the password may be received from over a network 118. For example, the computer system may be a rack-mounted or a blade server, for which remote boot-up is important. In this case, the number of unsuccessful logins may be limited to prevent someone from hacking in.

In step 420, the memory controller 120 uses this password to decrypt a key stored in hardware (e.g., a key register 140). In this fashion, only a user who knows the password may enable the encryption/decryption key.

The memory controller 120 uses this password to decrypt data from the storage device during boot-up, in step 430. For example, the memory controller 120 receives requests to load data on the storage medium 130 for the operating system and other programs, such as, device drivers, a boot-up program, etc.

In step 440, the memory controller 120 decrypts the data (e.g., operating system) using the key. In this fashion, the operating system is available during boot-up even though it was encrypted while stored on the data storage medium 130. Clearly, systems that require the operating system to perform encryption are incapable of this feat.

In another embodiment, the encryption of the data storage medium 130 may be on a partition basis. For example, the key that is used to encrypt the data depends on which portion of the data storage medium 130 is accessed. In this embodiment, the data storage medium 130 is partitioned into sections that are encrypted using unique keys. Referring now to process 500 of FIG. 5, in step 510 the data storage medium 130 is mapped into a number of partitions. This mapping may be stored in the memory controller 120. The operating system portion may be unencrypted (allowing for boot without password via BIOS) or may be encrypted with its own unique key, in which case boot-up may be according process 400 of FIG. 4.

In step 520, a number of unique keys are generated. Any suitable mechanism may exist for generating unique keys for the various partitions. For example, the operating system 112 may direct the memory controller 120 to generate keys for each partition.

In step 530, the keys are stored in the memory controller 120. There is no need to encrypt the keys and store them on the data storage medium 130.

In step 540, the memory controller 120 receives a request to store data on the data storage medium 130 in a particular partition, using a particular key. The operating system 112 may forward the proper password to the memory controller 120 when a user (e.g., engineering, marketing) desires to access the data storage medium 130. The memory controller 120 encrypts and stores the data, in response to this request.

An embodiment of the present invention provides for an encryption API (Application Programming Interface), which may be used by, for example, the operating system 112 or software programs 111. The encryption API allows data to be read from a specified main memory 160 location and written to a specified main memory 160 location. The two locations may be the same, in which case an in-place encryption decryption function is provided. As discussed herein, the actual encryption/decryption is performed in the hardware encryption/decryption engine 150. The operating system 120 may have a special driver or extension for accessing the encryption API.

Figure 6:
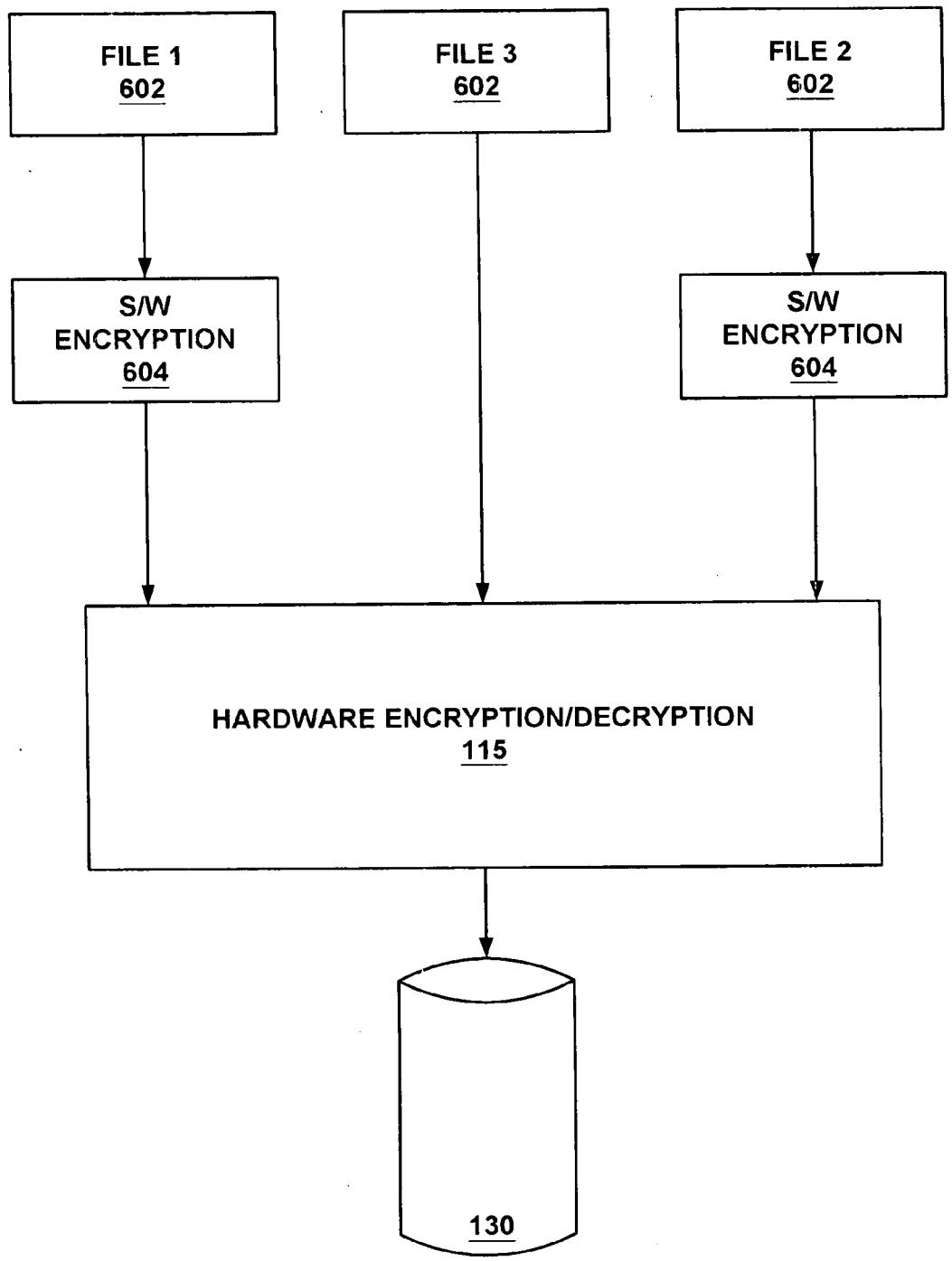
FIG. 6 is a block diagram illustrating files encrypted at both a software and a hardware level, according to an embodiment of the present invention.

Embodiments of the present invention may be used with file-by-file encryption performed in software (e.g., performed by the operating system). Referring now to FIG. 6, two separate files 602 (file 1 and file 2) are encrypted separately via software encryption 604. The encryption keys may be different and the encryption may be performed at separate times. A third file 602 (file 3) is not encrypted at the software level. The files 602 are passed to the card 115, which performs hardware encryption decryption. However, at the hardware level the same key may be used irrespective of which file 602 is being processed, although separate keys maybe used, if desired.

For a given input data block, the same encrypted result will always occur. Given that some input data blocks are more common than are others, the same output pattern may appear with greater frequency. For example, an input data block of all zeroes may be common. Hence, its encrypted counterpart will also appear more frequently. This may be undesirable as it may provide clues as to the nature of the encryption algorithm and/or the stored data. Furthermore, using the AES (advanced encryption standard) in CBC (cipher block chaining) mode (or feedback mode) may create scalability issues (e.g., as defined by the critical feedback path in AES) or additional latency (e.g., multiple unites operating at lower speed and sub-cluster sizes near the end may be aggregated together). Therefore, AES may be used in CTR (counter) mode to avoid the above-mentioned issues. The counter may be based on block number and address of 16 byte-aligned block. The address may be passed though a transform function, thus preserving the requirements of CTR counters.

The preferred embodiment of the present invention, a method and system for transparent encryption/decryption, is thus described. While the present invention has been described in particular embodiments, it should be appreciated that the present invention should not be construed as limited by such embodiments, but rather construed according to the below claims. In the claims, the order of elements does not imply any particular order of operations, steps, or the like, unless a particular elements makes specific reference to another element as becoming before, after, from, or words to that effect. In the claims, element indicators (e.g., "a)", "b)", etc.) do not indicate any particular ordering of the elements.

What is claimed is:

1. A graphics card comprising:
a plurality of registers, wherein each register stores a respective one of a plurality of keys that are not available unencrypted outside a controller and an encryption/decryption engine;
said controller for receiving a request to make available at least a portion of an operating system (OS), receiving a given one of said plurality of keys, transferring at least said portion of said operating system (OS) in an encrypted format from a data storage medium to said encryption/decryption engine, transferring said given one of said plurality of keys to said encryption/decryption engine, and making available said operating system (OS) in a decrypted format; and
said encryption/decryption engine for decrypting at a hardware level at least said portion of said operating system (OS) in said encrypted format using said given one of said plurality of keys and counter mode (CTR) of advanced encryption standard (AES) based on a block number and a byte aligned block address of said portion of said operating system in said encrypted format in said data storage medium passed through a transform function.

2. The graphics card of claim 1, wherein each of said registers stores said respective one of said plurality of keys in an encrypted format.

3. The graphics card of claim 2, wherein one of said plurality of keys is encrypted using a password of an administrator.

4. The graphics card of claim 1, wherein said controller is further for verifying a password received with said request.

5. The graphics card of claim 4, wherein said encryption/decryption engine uses said password to decrypt a corresponding one of said plurality of keys.

6. The graphics card of claim 1, wherein said encryption/decryption engine is implemented at a hardware level.

7. A graphics card comprising:
a means for storing a plurality of keys so that said key cannot be accessed outside of said graphics card;
a means for receiving a request to make available at least a portion of an operating system (OS);
a means for accessing a given one of said plurality of keys;
a means for receiving at least said portion of said operating system (OS) in an encrypted format from a storage device;
a means for decrypting at a hardware level at least said portion of said operating system (OS) using said given one of said plurality of keys and counter mode (CTR) of advanced encryption standard (AES) based on a block number and a byte-aligned block address of said portion of said operating system (OS) in said encrypted format in said storage device passed through a transform function; and a means for outputting said operating system (OS) in a decrypted format.

8. The graphics card of claim 7 wherein said means for storing said keys comprises a means for storing said plurality of keys in an encrypted format.

9. The graphics card of claim 8, further comprising a means for verifying a password received with said request.

10. The graphics card of claim 9, wherein said means for decrypting at least said portion of said operating system (OS) uses said password to decrypt a corresponding one of said plurality of keys.

11. The graphics card of claim 7, wherein one of said plurality of keys is encrypted using a password of an administrator.

* * * * *